(12) United States Patent
Leblanc

(10) Patent No.: US 6,813,720 B2
(45) Date of Patent: Nov. 2, 2004

(54) METHOD OF AND DEVICE FOR SUPPLYING ELECTRICAL POWER TO A LOAD USING A POWER MODULATION SYSTEM INCLUDING AT LEAST ONE CONTROLLED SWITCH AND OVERVOLTAGE COUNTING APPARATUS

(75) Inventor: Didier Leblanc, Limoges (FR)

(73) Assignees: LeGrand, Limoges (FR); LeGrand SNC, Limoges (FR)

( * ) Notice: Subject to any disclaimer, the term of this patent is extended or adjusted under 35 U.S.C. 154(b) by 495 days.

(21) Appl. No.: 09/734,647

(22) Filed: Dec. 13, 2000

(65) Prior Publication Data

US 2001/0014949 A1 Aug. 16, 2001

(30) Foreign Application Priority Data

Dec. 14, 1999 (FR) .............................. 99 15787

(51) Int. Cl.[7] .............................. G06F 1/26; H02H 3/22; G05F 1/455
(52) U.S. Cl. ........................ 713/330; 361/111; 323/237; 323/239; 324/521
(58) Field of Search ................................ 713/330, 300; 377/6; 324/521; 361/59, 61, 93.1, 78; 315/194; 363/37; 323/237

(56) References Cited

U.S. PATENT DOCUMENTS

| | | | | |
|---|---|---|---|---|
| 5,155,671 A | * | 10/1992 | Inaba et al. ................ 363/37 |
| 5,166,854 A | * | 11/1992 | Morishige ................. 361/91.6 |
| 5,239,255 A | * | 8/1993 | Schanin et al. ............. 323/237 |
| 5,629,607 A | * | 5/1997 | Callahan et al. ............ 323/237 |
| 5,910,875 A | * | 6/1999 | Tian et al. .................... 361/78 |
| 6,081,123 A | * | 6/2000 | Kasbarian et al. .......... 324/521 |
| 6,347,028 B1 | * | 2/2002 | Hausman et al. .......... 361/93.1 |
| 6,380,692 B1 | * | 4/2002 | Newman et al. ............ 315/194 |

FOREIGN PATENT DOCUMENTS

| | | |
|---|---|---|
| EP | 0588273 A1 | 3/1994 |
| EP | 0618667 A1 | 10/1994 |
| EP | 0923274 A2 | 6/1999 |

* cited by examiner

Primary Examiner—Thomas Lee
Assistant Examiner—Chi Whan Chung

(57) ABSTRACT

The operating mode of a power modulation system is determined according to the nature of the load. The power modulation system can operate in either of two operating modes, namely a "reverse phase control" mode and a "forward phase control" mode. To this end, the load is supplied with power under predetermined low-load operating conditions by the power stage in the "reverse phase control" mode, overvoltages are detected and the power modulation system is caused to change to the "forward phase control" operating mode if an excessive number of overvoltages is detected.

20 Claims, 2 Drawing Sheets

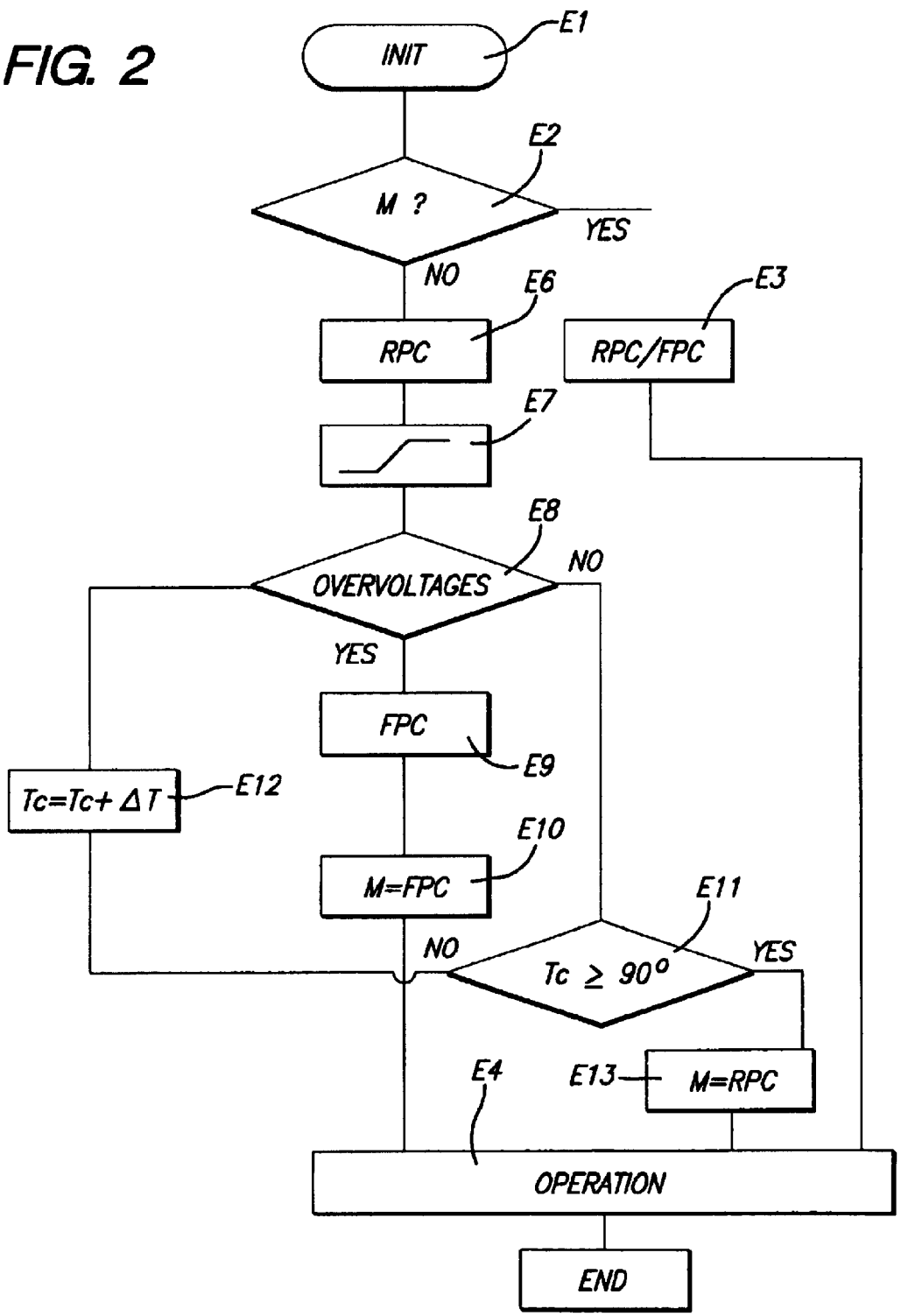

METHOD OF AND DEVICE FOR SUPPLYING ELECTRICAL POWER TO A LOAD USING A POWER MODULATION SYSTEM INCLUDING AT LEAST ONE CONTROLLED SWITCH AND OVERVOLTAGE COUNTING APPARATUS

BACKGROUND OF THE INVENTION

1. Field of the Invention

The invention relates to a device for supplying electrical power to a load, for example one or more lamps, by means of a power modulation system with controlled switch(es) that can operate in either of two operating modes referred to hereinafter as a "reverse phase control" mode and a "forward phase control" mode.

The invention also relates to a device for supplying power to a load adapted to implement the method.

2. Description of the Prior Art

When electrical power is supplied by means of a switched mode power modulation system, the operating mode of the power modulation system must be matched to the type of load, which is either inductive or capacitive. This problem is encountered more and more frequently, including in the lighting field where low-voltage halogen lamps are increasingly used. The voltage-reducing transformer that feeds the lamp can be a conventional transformer with windings, i.e. a transformer formed by coupling two self-inductances, or a so-called "electronic" transformer, whose behavior is capacitive. To control one or more low-voltage halogen lamps provided with a voltage-reducing transformer by adding a power modulation system between the alternating current supply and the "transformer(s)" providing the low-voltage conversion, it is necessary to adapt the operation of the power modulation system to suit the type of load, in particular to its inductive or capacitive behavior.

To be more precise, a capacitive or resistive load must be supplied with power by a power modulation system that can operate in the "reverse phase control" mode. In this case the semiconductor switches, which can be turned on and off, are turned on to allow the current to flow into the load at the beginning of a half-cycle of the AC voltage and are opened before the end of the half-cycle, after a time-delay depending on the required level of illumination.

In contrast, an inductive load must be supplied with power by a power modulation system operating in the "forward phase control" mode, in which the controlled switches of the power modulation system are not turned on at the beginning of each half-wave of the mains voltage but at a given time within its duration and until the end of the half-wave.

A purely resistive load can be supplied with power by a power modulation system operating in either mode.

The facility to change from one operating mode to another requires the designer of the power modulation system to include bipolar transistors, field-effect power transistors or insulated-gate bipolar transistors (ICBT); this list is not limiting, on the other hand, thyristors and/or triacs cannot operate in the "reverse phase control" mode.

Various solutions to the above problem have already been proposed.

EP 0 618 667 describes a system for supplying power to a load including controlled switches that can operate with a selected synchronization mode in either of two operating modes, namely a "reverse phase control" mode and a "forward phase control" mode.

To choose the correct operating mode, which depends on the nature of the load, which the user does not always know, there is provision for analyzing the load beforehand to find out if the power modulation system must be configured to operate in the "reverse phase control" mode if the load is capacitive or resistive or must be configured in the "forward phase control" mode if it is inductive. According to the teaching of the above document, during a test program independent of the normal power supply conditions for the load a control pulse is applied to the load and the nature of the load (inductive or capacitive) is deduced from its reaction to the pulse. The power supply system is then set to the required operating mode by a particular switch synchronization configuration. Only then is the load actually connected to the power modulation system to be supplied normally with power in the chosen operating mode.

WO-A-92/15052 describes a device in which the load is first supplied with power normally by setting the power modulation system to the "reverse phase control" mode a priori. If overvoltages appear at the terminals of the load, the operating mode is switched. However, with a system of this kind overvoltage detection applies regardless of the operating conditions. High voltage spikes can damage the circuits before the operating mode can be changed. The invention solves this problem.

SUMMARY OF THE INVENTION

The invention provides a method of supplying power to a load via a power modulation system including at least one controlled switch adapted to operate in either of two operating modes, namely a "reverse phase control", mode and a "forward phase control" mode, wherein the power modulation system is switched on in the "reverse phase control" mode, the load is supplied with power via the power modulation system, which is commanded to operate under predetermined low-load operating conditions, and then, when the low-load operating conditions are established, overvoltages are detected during a given period and the power modulation system is caused to change to the forward phase control mode if an excessive number of overvoltages is detected during the given period.

Overvoltages are preferably detected at the terminals of the controlled switch(es). They could equally well be detected at the terminals of the load.

According to an advantageous feature of the invention, the decision whether to change the operating mode allows for the number of overvoltages that have occurred during the aforementioned predetermined time interval. If the number of overvoltages during that time interval is greater than a given number, the power modulation system switches automatically to the "forward phase control" mode. The operating mode is changed by modifying the synchronization of the controlled switches of the power modulation system. This is known in the art. To be more precise when the power modulation system is operating in the "reverse phase control" mode the controlled switches are synchronized to the zero-crossing of the mains voltage. When the power modulation system is operating in the "forward phase control" mode the controlled switches are synchronized to the zero-crossing of the current flowing in the load. Both control modes are compatible with purely resistive loads. The power modulation system could simply remain in the reverse phase control mode.

In one embodiment, the "forward phase control" operating mode is selected if the number of overvoltages is at least equal to a given percentage of the number of half-periods of the mains voltage during the predetermined time interval. That percentage can be fixed at around 50%, for example.

According to another advantageous feature of the invention, each time the power modulation system is commanded to achieve the predetermined low-load operating conditions, the conduction time of the switches is progressively increased until the power modulation system is operating under the predetermined low-load operating conditions. For example, this progressive starting phase (which precedes the analysis phase during which operation stabilizes under the low-load operating conditions) can last about 500 milliseconds. During the progressive starting phase the conduction time of the controlled switches during a half-period of the AC voltage varies progressively from a very small value up to 2 milliseconds. When the conduction time has stabilized at 2 milliseconds per half-cycle in the "reverse phase control" mode, the power modulation system is deemed to have stabilized under the predetermined low-load operating conditions. Detection of overvoltages at the terminals of the load then begins, and continues for a period of the order of 200 milliseconds, for example. If an excessive number of overvoltages is detected during that period, a microprocessor generates an instruction Lo change operating mode and the power modulation system changes to the "forward phase control" mode.

On the other hand, at the end of the period for detecting overvoltages under the aforementioned predetermined low-load operating conditions, if the number of overvoltages detected is insufficient for the operating mode to have been changed, it is advantageous to increase the conduction time of the controlled switches by a predetermined amount until new established predetermined operating conditions are achieved and, under those new operating conditions, to resume detection of overvoltages at the terminals of the load during a new given period. If the number of overvoltages under these operating conditions exceeds a predetermined value, the microprocessor causes the synchronization means to cause the power modulation system to operate in the "forward phase control" mode. The operating conditions of the power modulation system change successively (the operating conditions increasing on each step) and, for each step under given operating conditions, detection of overvoltages is resumed. If the number of overvoltages detected exceeds a corresponding prescribed value, the "forward phase control" operating mode is selected. For as long as the power modulation system remains in the "reverse phase control" operating mode, the operating conditions of the power modulation system change successively until the conduction time of the controlled switches reaches a given value. The conduction time can be chosen to be close to 90° of the phase of the period of the AC supply, for example. When the last step corresponding to those operating conditions is reached, without excessive numbers of overvoltages being detected, then the power modulation system remains in the "reverse phase control" operating mode.

Information representative of a selected operating mode corresponding to a particular load can advantageously be stored so that it becomes possible to select that operating mode directly each time the power modulation system is started up when connected to that same particular load, without having to repeat the operations described above.

The power modulation system is preferably started up each time with a progressive starting phase as described above.

The invention also provides a device for supplying power to a load, including a power modulation system including at least one controlled switch and means for selecting a "reverse phase control" or "forward phase control" operating mode of the power modulation system, an overvoltage detector, control means for imposing predetermined low-load operating conditions on the power modulation system in the "reverse phase control" mode, overvoltage analysis means connected to the overvoltage detector and control means for changing the operating mode of the power modulation system. The control means are controlled by information produced by the analysis means. The overvoltage detector is preferably connected to the terminals of the controlled switch(es). It could be connected to the terminals of the load.

As indicated above, the overvoltage analysis means advantageously include means for counting overvoltages.

The device advantageously further includes a memory for storing information representative of an operating mode suited to the nature of the load connected to the power supply device.

The invention will be better understood and other A advantages of the invention will become more clearly apparent in the light of the following description of a device in accordance with the invention for supplying a load with power, which description is given by way of example only and with reference to the accompanying drawings.

BRIEF DESCRIPTION Of THE DRAWINGS

FIG. 2 is a flowchart explaining how the device works.

DETAILED DESCRIPTION OF THE PREFERRED EMBODIMENT

Figure 1:
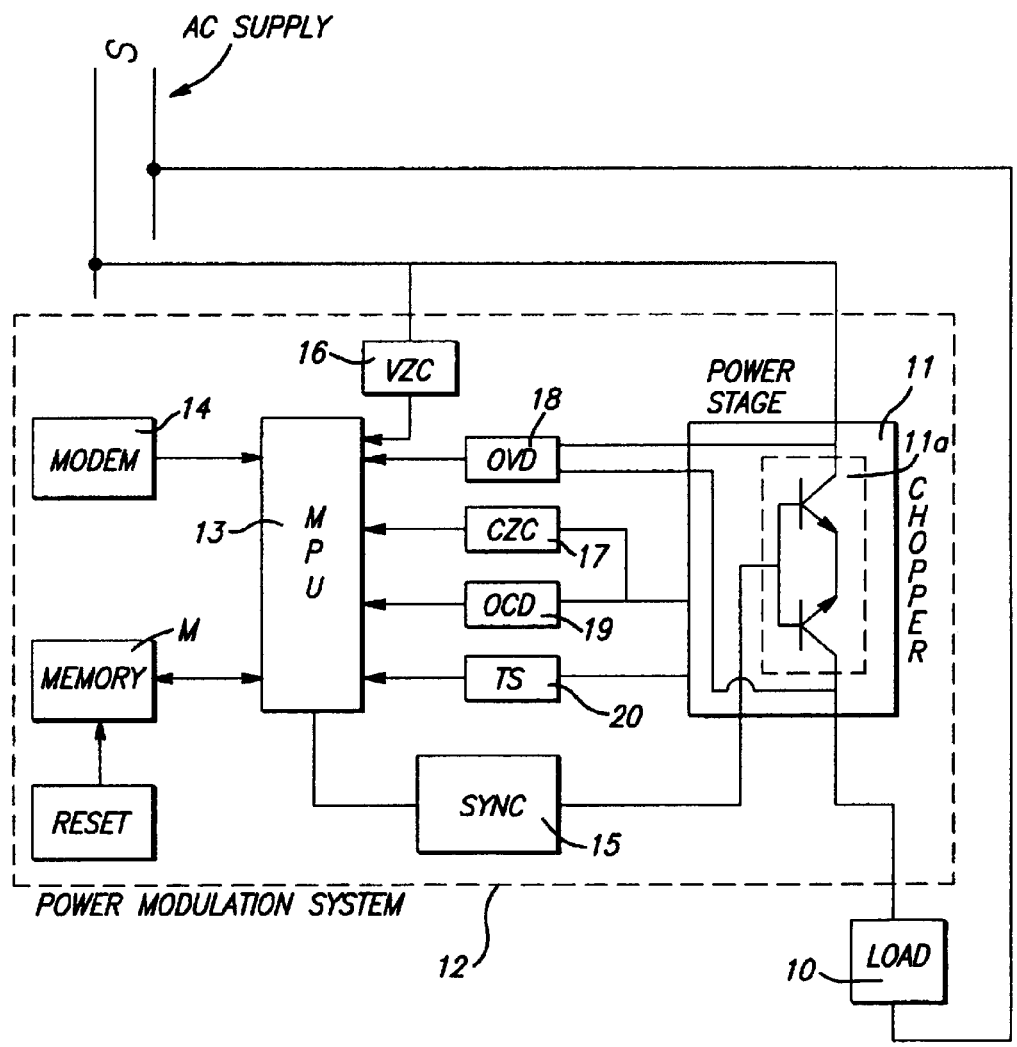
FIG. 1 is a block diagram of a power supply device connected to a load.

Referring to FIG. 1 in particular, a load 10 is connected to an AC supply via the power stage 11 of a power modulation system 12 including controlled switches. To be more precise, the power stage 11 includes at least one transistorized "chopper" circuit 11a for "chopping" the AC voltage of the AC supply. The power stage 11 generally includes two controlled switches for chopping the positive and negative half-cycles, respectively. The power stage 11 can include two IGBT, for example. Its theory is known in the art and it is not described in more detail here. The power modulation system further includes a microprocessor 13 (MPU in the diagram) which in this example is controlled via a modem 14. The microprocessor controls a synchronization circuit 15 (SYNC in the diagram) which selects and monitors the operating mode of the power stage 11. In the "reverse phase control" mode, the power stage 11 is synchronized to the zero-crossing of the AC voltage and in the "forward phase control" operating mode the power stage 11 is synchronized to the zero-crossing of the current flowing in the load 10. This method of synchronization, enabling a change from one operating mode to the other, is known in the art.

Assume that the user is unaware of the nature of the load 10, which can be capacitive, inductive or purely resistive. For this reason the power modulation system includes a number of detector circuits adapted to generate information which is analyzed by the microprocessor 13. There are therefore a detector 16 for detecting the zero-crossing of the mains voltage (VZC in the diagram), a detector 17 for detecting the zero-crossing of the load current (CZC in the diagram), an overvoltage detector 18 (OVD in the diagram) shunting the transistorized chopper circuit 11a, a short circuit detector 19 (SCD in the diagram) and a temperature sensor 20 (TS in the diagram). The microprocessor 13 is additionally connected to a memory M which can store information representative of an operating mode suited to the nature of the load 10. The microprocessor 13 can be programmed to erase the memory M each time that the load 10 is disconnected from the power modulation system 12, for example. On the other hand, the microprocessor 13 writes information representative of the nature of the load (inductive or capacitive), when the latter is known, into the memory M. The detectors 16 and 17 supply information to the microprocessor 13 enabling it to drive the synchronization circuit 15 in either of the operating modes mentioned above. The overvoltage detector 18 supplies information to the microprocessor 13 each time that an overvoltage is detected at the terminals of the controlled switch(es). In this example, the microprocessor 13 is programmed to count the number of overvoltages during a detection period defined above. Consequently, the overvoltage analysis means include the overvoltage detector 18 associated with the load and counting mean of such overvoltages, which the microprocessor itself. The means for commanding the change of operating mode of the power stage 11 comprise the microprocessor 13 and the synchronization circuit 15.

The circuit 19 detects a short circuit across the load and the circuit 20 detects overheating of the power stage 11, The microprocessor processes the signals delivered by these two detectors, for example to disconnect the power supply from the load automatically and to generate an alarm signal.

Means are provided for intentionally erasing the memory M (RESET in the diagram). The user can therefore erase the memory M on switching on or after an alarm by pressing a pushbutton to reset the device, detect any overvoltages and test for the appropriate operating mode.

The operation of the power supply device just described is explained next with reference to FIG. 2. Step E1 is a system initialization phase (INIT in the diagram). It is assumed that the load is connected to the device and that the device is switched on.

Step E2 is a test during which the microprocessor checks whether information representative of the nature of the load 10 is written in the memory M. If the response to the test is YES, the next step is the step E3 in which the synchronization circuit 15 is immediately driven by the microprocessor 13 and operates either in the "reverse phase control" mode or in the "forward phase control" mode, depending on the information written in the memory M.

The next step is the step E4 in which the load is supplied with power under different operating conditions chosen by the user. The user's instructions are transmitted to the microprocessor 13 via the modem 14. Progressive starting operating conditions lead to predetermined low-load operating conditions. The chosen operating conditions are then established. If overvoltages, overheating or a short circuit are detected during operation the system is shut down automatically and an alarm is tripped.

If the response to the test E2 is NO, the next step is the step E6 in which the power stage of the power modulation system is driven via the synchronization circuit 15 and operates in the "reverse phase control" mode.

In step E7, the power stage is progressively supplied with power until predetermined low-load operating conditions are reached. As indicated above, the low-load operating condition are obtained by progressively increasing the time for which the controlled switches of the power stage 11 are turned on.

The next step is the step E8 which is a test to detect overvoltages at the terminals of the load for a predetermined time period; this is the function of the detector 18. The microprocessor 13 counts the overvoltages and determines if the number of overvoltages is excessive.

If the response is YES, the next step is the step ED in which the power stage 11 operates in the "forward phase control" mode.

The next step is the step E10 in which information representative of "forward phase control" operating mode is written into the memory M. The next step is the step E4.

If the response to the test in the step E8 is NO, the next step is the step E11 which is a test to determine whether the conduction time of the IGBT of the power stage 11 is greater than or equal to 90° of the phase of the AC voltage cycle.

If the response is NO, the next step is the step E12 in which the conduction time Tc is increased by a predetermined amount ΔT to change the operating conditions of the power modulation system, after which the next step is the step E8.

It the response to the test in the step E11 is YES, the next step is the step E13 which consists of writing information representative of the "reverse phase control" operating mode into the memory M.

The next step is the step E4, which has already been described.

What is claimed is:

1. A method of supplying power to a load via a power modulation system including at least one controlled switch adapted to operate in either of two operating modes, namely a "reverse phase control" mode and a "forward phase control" mode, wherein said power modulation system is switched on in said "reverse phase control" mode, said load is supplied with power via said power modulation system, which is commanded to operate under predetermined low-load operating conditions, and then, when said low-load operating conditions are established, overvoltages are detected during a given period and said power modulation system is caused to change to said forward phase control mode if an excessive number of overvoltages is detected during said given period.

2. The method claimed in claim 1 wherein overvoltages are counted during said given time interval and said forward phase control operating mode is selected if the number of overvoltages detected during said period is greater than a given number.

3. The method claimed in claim 2 wherein said forward phase control operating method is selected if the number of overvoltages is at least equal to a given percentage of the number of half-periods of the AC voltage during said predetermined time interval.

4. The method claimed in claim 3 wherein said percentage is of the order of 50%.

5. The method claimed in claim 1 wherein each time said power modulation system is commanded to operate under predetermined low-load operating conditions the conduction time of said switch(es) is progressively increased during a predetermined period until said power modulation system is operating under said predetermined low-load operating conditions.

6. The method claimed in claim 1 wherein at the end of said period for detecting overvoltages, if the operating mode has not been changed, the conduction time of said controlled switch(es) is increased by a predetermined amount until new predetermined operating conditions are established, detection of overvoltages is resumed for a given period and said power modulation system is caused to change to said forward phase control operating mode if an excessive number of overvoltages is detected during said given period.

7. The method claimed in claim 6 wherein operating conditions of said power modulation system change progressively and detection of overvoltages is repeated until said conduction time of said switch(es) reaches a given value and said power modulation system remains in said reverse phase control operating mode if the number of overvoltages detected is insufficient to justify a change of operating mode for each of said established operating conditions.

8. The method claimed in claim 1 wherein information representative of a selected operating mode corresponding to a particular load is stored and that operating mode is selected directly each time said power modulation system is started up when connected to said particular load.

9. The method claimed in claim 8 wherein said information representative of an operating mode is deleted and operation with detection of overvoltages is started up again.

10. The method claimed in claim 1 wherein overvoltages are detected at the terminals of said controlled switch.

11. A device for supplying power to a load, including a power modulation system including at least one controlled switch and means for selecting a "reverse phase control" or "forward phase control" operating mode of said power modulation system, an overvoltage detector, control means for imposing predetermined low-load operating conditions on said power modulation system in said "reverse phase control" mode, overvoltage analysis means connected to said overvoltage detector and control means for changing the operating mode of said power modulation system.

12. The device claimed in claim 11 wherein said overvoltage analysis means include means for counting said overvoltages.

13. The device claimed in claim 11 including a memory for storing information representative of an operating mode suited to the nature of said load.

14. The device claimed in claim 11 wherein said overvoltage detector is connected to terminals of said controlled switch(es).

15. A method of supplying power to a load via a power modulation system, comprising the sequential steps of:

supplying a load with power from a main voltage, the load connected to a power modulation system having a control switch configured to operate in either of a reverse phase control mode and a forward phase control mode, by switching the power modulation system on in the reverse phase control mode;

controlling the control switch to operate the load in a stabilized low-load operating condition with a supplied voltage derived from the main voltage;

monitoring the supplied voltage for overvoltages; and upon detecting a number of overvoltages during a given period exceeding a present number of overvoltages for the given period, switching the power modulation system from the reverse phase control mode to the forward phase control mode, wherein the control switch comprises controlled switches and the controlling of the control switch to operate the load comprises controlling the controlled switches.

16. The method of claim 15, wherein the low-load operating condition is a stabilized low-load operating condition as indicated by a stabilized conduction time of the controlled switches of the control switch.

17. The method of claim 15, wherein the preset number of overvoltages during the given period equals 50% of the number of half-periods of the main voltage during the given period.

18. The method of claim 16, wherein the controlled switch is a transistorized chopper circuit with two controlled switches for chopping positive and negative half-cycles of the main voltage.

19. The method of claim 15, wherein the monitoring for overvoltages is achieved by monitoring voltage at terminals of the controlled switches of the control switch.

20. The method of claim 15, wherein the monitoring for overvoltages is achieved by monitoring voltage at terminals of the load.

* * * * *